Sept. 21, 1943.  E. W. SHALLOCK  2,329,948
FEEDER MEANS
Filed May 1, 1941  3 Sheets-Sheet 3

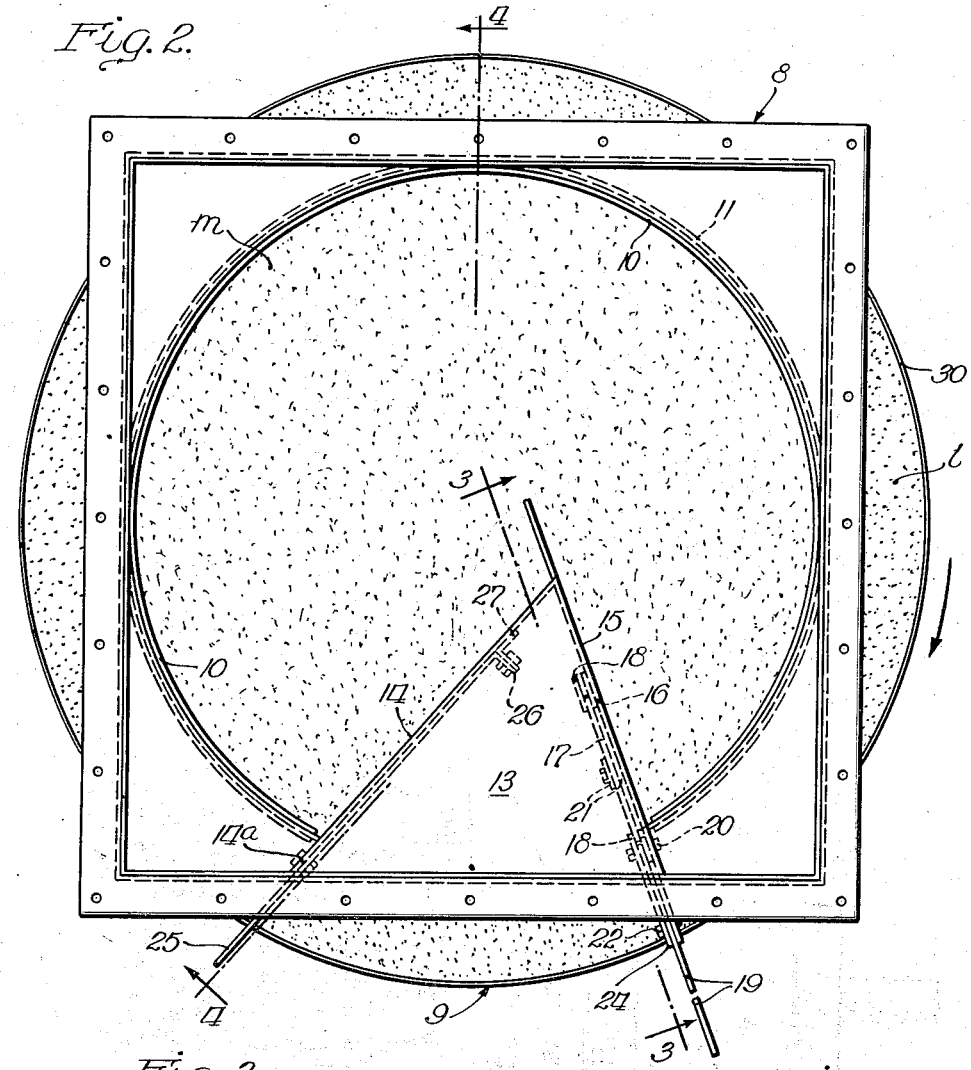

INVENTOR.
Edward W. Shallock
BY
Attys

Patented Sept. 21, 1943

2,329,948

UNITED STATES PATENT OFFICE 2,329,948

FEEDER MEANS

Edward W. Shallock, Chicago, Ill., assignor to American Ore Reclamation Company, Chicago, Ill., a corporation of New York Application May 1, 1941, Serial No. 391,287

5 Claims. (Cl. 221—125)

The invention relates to feeder means, and has to do with feeder means intended for use in sintering plants and analogous establishments.

In sintering plants, the materials to be sintered are stored in bins, usually remote from the sintering machine, from which they are delivered in appropriate proportions to a conveyor, the latter delivering these materials to a mixer, from which the mixture of materials is delivered to the sintering machine. In a known form of means for delivering the materials from the bins to the conveyor, each of the bins has a depending hopper which directs the material from that bin downwardly onto the upper face of a revolving feeder table, the hopper being provided with means for permitting regulated flow of the material therefrom and having associated therewith a scraper plate extending beyond the table, at the side thereof at which the conveyor is located, this scraper plate serving to deflect the material and to discharge it from the table downwardly onto the conveyor. Frequently, the material being handled is highly abrasive and causes wear of the table and the supporting means therefor, resulting in appreciable downward movement or lowering of the table. It is the usual practice to mount the table on a vertical shaft rotated by a worm wheel secured on the shaft and a worm meshing with the wheel and secured on a driven shaft. It is necessary that the axis of the worm be in the central horizontal plane of the tooth face of the worm wheel, in order to assure proper drive between these members, and avoid binding, with resulting excessive wear. Due to that necessity, considerable difficulty has been experienced in plants having feeder tables driven in the manner stated.

My invention is directed to feeder means in which the above noted objections to the present type of feeder table and associated parts, above referred to, are avoided. I provide means whereby wear of the feeder table is relatively slight compared to the present practice above referred to, and downward movement of the feeder table incident to wear of the supporting and bearing means therefor is accommodated without impairing the drive of the table or causing binding of parts and resulting excessive wear thereof. More specifically, in the arrangement of my invention, a layer of the material delivered from the bin is maintained upon the upper face of the feeder table and serves to protect the latter against wear, while also assuring proper delivery of the material from the hopper to the scraper plate, and the shaft which supports the feeder table is mounted to accommodate downward movement incident to wear, and is driven by intermeshing gear members of a character to permit such downward movement while maintaining proper mesh between such members without binding thereof. In addition, the feeder table and the associated transmission unit for driving it are so related that the drive unit may be removed and replaced with expedition and facility, without necessity for removing the table and the material supported thereby and in the bin above it, which effects a material saving in time and work in repairing or replacing the drive unit. I also provide clutch means controlling the drive of the feeder table and automatically released in the event of overloading of the table, to avoid excessive stresses with resulting possible breakage or damage to the feeder table and the parts associated therewith.

Further objects and advantages of my invention will appear from the detail description.

In the drawings:

Figure 2 is a plan view of the hopper and the feeder table, taken substantially on line 2—2 of Figure 1;

Figure 3 is a sectional view of the hopper taken substantially on line 3—3 of Figure 2;

Figure 6 is a diagram of the signal light circuits.

Figure 1:
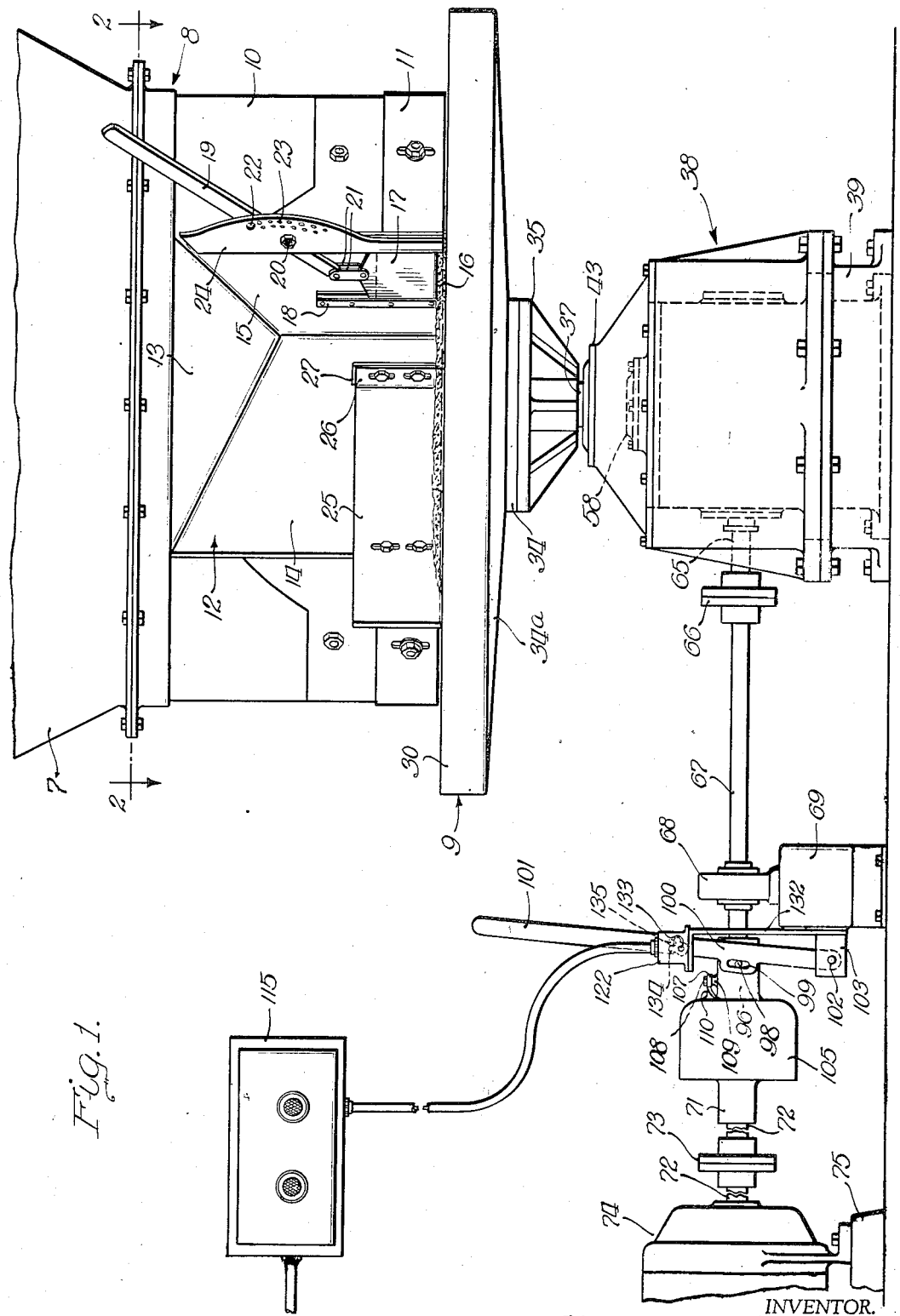
Figure 1 is a front view of feeder means embodying my invention, with certain parts broken away.

In the drawings I have shown the lower portion of a bin 7 to which is bolted or otherwise suitably secured the upper end of a hopper 8 which, in general, is of known construction and depends from the bin above a feeder table 9. Bin 7 opens freely into hopper 8 and table 9 supports the material thereon, as will appear more fully presently, and supports in part the load of the material within the bin, serving in conjunction with hopper 8 to prevent discharge of material from the bin except as required in accordance with discharge of material from table 9, as will be explained more fully later. Hopper 8 comprises a substantially cylindrical body 10, on the lower end portion of which is adjustably mounted, by bolt and slot means, or in any other suitable manner, a seal ring 11. Body 10 of hopper 8 is provided with a housing 12 of triangular shape in plan, comprising a downwardly and inwardly inclined top wall 13 and side walls 14 and 15 converging inwardly of body 10, this housing 12 opening at its outer end through one side of body 10. Wall 15 is provided with an opening 16, conveniently of rectangular outline, extending from its lower edge and controlled by a gate 17 slidable in guides 18 suitably secured to wall 15. A lever 19, pivoted at 20, is connected to the upper end of gate 17, at its inner end, by links 21 pivoted to the gate and to the lever, the latter being held in adjustment by a pin 22 inserted through a selected one of a series of openings 23 in an arcuate plate 24, the pin also being inserted through an opening in lever 19. The gate and lever provide means for controlling the effective size of opening 16, and thus controlling the rate of discharge of material through this opening into housing 12, as will appear more fully presently. A scraper plate 25, provided at its inner end with an angularly disposed flange 26, is secured to an angle bracket 27 welded or otherwise secured to wall 14, and to an outer extension 14a of the latter wall, as shown more clearly in Figure 2. Preferably, plate 25 is secured to bracket 27 and to extension 14a of wall 14 by slot and bolt means, permitting of this plate being adjusted vertically, though any other suitable means may be employed for securing the scraper plate 25 in position. The hopper 8 is, in general, of known construction and need not be illustrated nor described here in greater detail.

Body 10 of hopper 8 is of materially less diameter than table 9, and is disposed coaxially therewith, and scraper plate 25 extends outward beyond the table, as shown in Figure 2. Table 9 is provided with a depending circumferential flange 29 (Figure 4), to which is secured, conveniently by bolt and slot means, a ring 30 projecting above table 9 and providing an upwardly extending circumferential retaining flange extending thereabove. Table 9 is rotated, in a manner to be later described, in clockwise direction as viewed in Figure 2. The material is delivered from bin 7 into hopper 8, body 10 of which may contain a considerable volume of material designated m in Figure 4. Seal ring 11 is so adjusted that the lower edge thereof is substantially in the plane of the upper edge of ring 30, and scraper plate 25 is similarly adjusted. During the rotation of table 9, with gate 17 open, the material m will pass through opening 16 into housing 12, and will be deflected by scraper plate 25 so as to travel outward along the latter and be discharged from table 9 at one side thereof. The material thus discharged from the table passes downward onto the upper run 31 of a conveyor C of known type, upper run 31 of which is concaved downwardly in cross section and is below and, in part, beneath table 9, lower run 32 of this conveyor being flat or straight in cross section. By properly adjusting gate 17 and rotating table 9 at constant speed, the rate at which the material is delivered to the conveyor may be accurately controlled.

The portion of ring 30 projecting above the upper face of table 9 provides an annular flange effective for retaining upon the table a bed or layer l of material, which layer is of appreciable depth and serves to guard table 9 against abrasion or wear by the material being handled. A further advantage of providing the layer l of material is that it renders easier and more accurate the handling of materials which are more or less fluid or slippery, such, for example, as filter cake which is of a wet, clay-like consistency, and would slip in contact with metal, the result being that such material is often difficult to deliver at a uniform rate from the body 10 of hopper 8 to housing 12 and the scraper plate 25. I find that by providing a layer, such as the layer l, of filter cake or analogous material on the table 9, the mass of material m above this layer will adhere to the latter and will travel with the table 9 more readily than if such a layer were not provided, rendering more accurate feeding of materials of the character referred to possible. In either case, the underlying layer l of the material remains stationary, or substantially so, relative to table 9 during the feeding operation, due to friction, with the result that the wear of table 9 is much less than would be the case if this layer l of material were not retained thereon.

Table 9 is provided with a central depending hub 33 provided at its lower end with an outwardly extending flange 34, there being reenforcing webs 34a at the underface of table 9 extending from hub 33 and flange 34. Flange 34 seats upon the upper face of a flange 35 extending outward from the upper end portion of a hub 36 keyed on the upper end of a vertical shaft 37 of stepped formation. The flanges 34 and 35 are bolted together, for a purpose to be explained later. Rotation of shaft 37 serves to impart the desired rotation to table 9.

Shaft 37 is mounted within and extends above a gear housing 38 bolted or otherwise suitably secured upon a supporting base 39. Housing 38 is provided with a removable cover 40 bolted thereon, provided with a thickened collar 41 in which is suitably mounted a roller bearing assembly 42 through which shaft 37 extends, this assembly serving to take the radial thrusts of the shaft, there being a cover 43 bolted on the upper end of collar 41 and fitting about shaft 37. At its lower portion, shaft 37 is of increased diameter, at 45, below which the shaft is reduced in diameter to provide a terminal stud 46. This stud 46 fits through inner race 47 of a roller bearing assembly 48 comprising a flanged outer race 49, seating upon the upper end of a thickened collar 50 formed integrally with the lower wall of housing 38, there being downwardly tapering bearing rollers 51 confined between the races 47 and 49. The shoulder at the lower end of enlarged portion 45 of shaft 37 seats upon inner bearing race 47, the bearing assembly 48 thus serving to support shaft 37 and the load carried thereby. A cover 52 is bolted to the lower end of collar 50, it being noted that this cover is spaced away from the lower end of stud 46 so as not to interfere with downward movement of shaft 37 incident to wear thereof and of the bearing assembly 48.

A vertical countershaft 53 is mounted at its upper end in a roller bearing assembly 54 appropriately mounted in a collar 55 of cover 40 and, at its lower end, in a roller bearing assembly 56 appropriately mounted in a collar 57 formed integrally with the lower wall of housing 38. A cover plate 58 is bolted on the upper end of collar 55, a similar cover plate 59 being bolted on the lower end of collar 57. Countershaft 53 is thus mounted for rotation about a vertical axis to one side of shaft 37.

Figure 4:
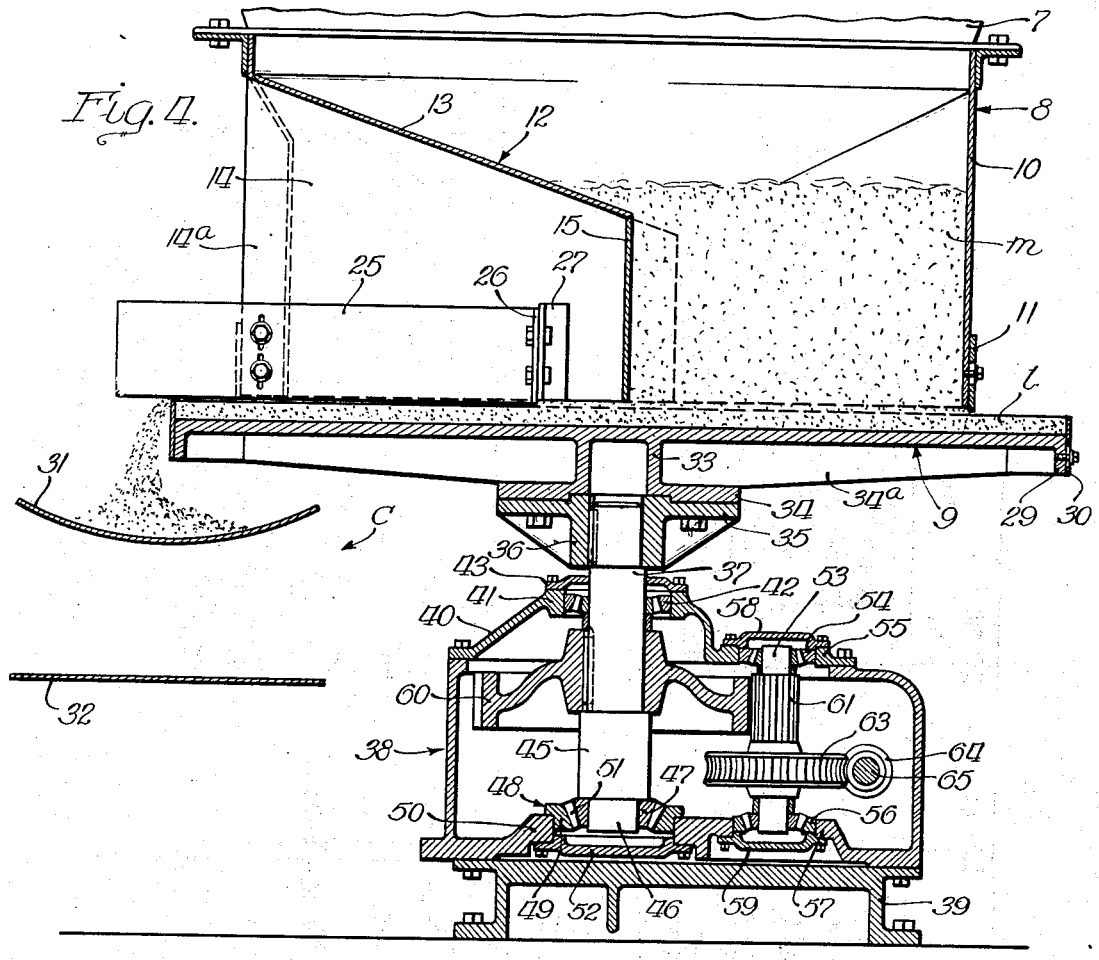
Figure 4 is a sectional view taken substantially on line 4—4 of Figure 2, with certain parts shown in elevation, this view also showing the conveyor in transverse section.

A gear 60 is keyed on shaft 37 at the upper end of enlargement 45 thereof, and meshes with a pinion 61 keyed on countershaft 53, the tooth face of this pinion being of appreciably greater width than the tooth face of gear 60. The latter is shown as a spur gear, as is the pinion 61, but the gear and pinion may be of any other suitable type which will accommodate downward movement of gear 60 relative to pinion 61 without interfering with proper operating mesh therebetween. Such downward movement of gear 60 occurs in the downward movement of shaft 37, it being noted that the lower end of hub 36 is spaced above the cover 43, as shown in Figure 4, and, as previously noted, the lower end of stud 46 is spaced above cover plate 52 to permit such downward movement of shaft 37 which, as will be understood, will not be great. The materials handled by table 9 are frequently highly abrasive in character and, in spite of all precautions, a small amount of such materials may enter housing 38 and the bearing assemblies. That, in conjunction with the weight supported by shaft 37, results in wear of the shaft and of the lower bearing assembly 48 and associated parts, with the result that after the table has been in use for some time, shaft 37 moves slightly downward. Such movement of this shaft is accommodated by the intermeshing gear 60 and pinion 61, without in any way interfering with the drive between these members.

A worm wheel 63 is keyed on countershaft 53, in mesh with a worm 64 secured on a driven stub shaft 65, mounted for rotation in housing 38 in any suitable manner. The outer end of shaft 65 is secured by a detachable coupling 66, of suitable known type, to a shaft 67 rotatably mounted in a bearing structure 68 suitably secured to a supporting block 69. The other end of shaft 67 is piloted in a bushing 70 mounted in one end of a sleeve 71 keyed on one end of a drive shaft 72, which drive shaft includes a coupling 73 of known type and is driven by an electric motor 74 mounted upon a supporting block 75, or in any other suitable manner. Suitable means is provided for clutching and declutching shaft 67 to and from shaft 72, and for automatically declutching these shafts responsive to overloading of table 9, as will now be explained.

Sleeve 71 is provided, at the outer end thereof, with an outwardly extending flange 77, from one face of which extends a thickened annularly recessed collar 78. A drive clutch plate 79 seats in collar 78 and is bolted or otherwise suitably secured thereto, plate 79 being provided at each face thereof with an annular friction lining or covering 80, of suitable material secured thereto in a known manner. A sleeve 81 is splined on shaft 67 for movement lengthwise thereof and rotation therewith. This sleeve 81 carries, at the end thereof adjacent sleeve 71, a driven clutch plate 82 disposed at one side of clutch plate 79 for cooperation therewith. A collar 83 is splined on sleeve 81 for movement lengthwise thereof and rotation therewith, and carries a driven clutch plate 84 disposed at the other side of drive clutch plate 79 for cooperation therewith. A flanged pressure sleeve 85 is threaded on the other end portion of sleeve 81 for adjustment lengthwise thereof, any suitable known means being provided for locking sleeve 85 against rotation relative to sleeve 81 and securing it in adjustment. At its inner end sleeve 85 is provided with an outwardly extending circumferential flange 86 disposed for cooperation with nose 87 of a cam member 88, pivoted on a pin 89, extending between two web elements, one of which is shown at 90, integrally connecting collar 83 and driven clutch plate 84. In practice, several cam members 88 are provided, there being a pair of web elements 90 for each member 88 as will be understood. Cam member 88 is provided with a shank 91 extending therefrom outwardly beyond sleeve 85, the outer portion of which shank is bifurcated to provide two arms between the outer ends of which is pivoted, by means of a pin 92, the upper end of a link 93. The lower or inner end of link 93 is pivoted by a pin 94 between a pair of web elements, one of which is shown at 95, at one end of a sleeve 96 slidably mounted on shaft 67 which, as will be understood, is an extension of the driven shaft 65. Adjacent its outer end sleeve 96 is provided with a circumferential groove which receives a collar 97 having diametrically opposite, outwardly projecting studs 98 which extend into slots 99 formed in yoke 100 of a clutch lever 101 pivoted at its lower end, at 102, as shown in Figure 1, between angle brackets 103 suitably secured to block 69.

Figure 5:
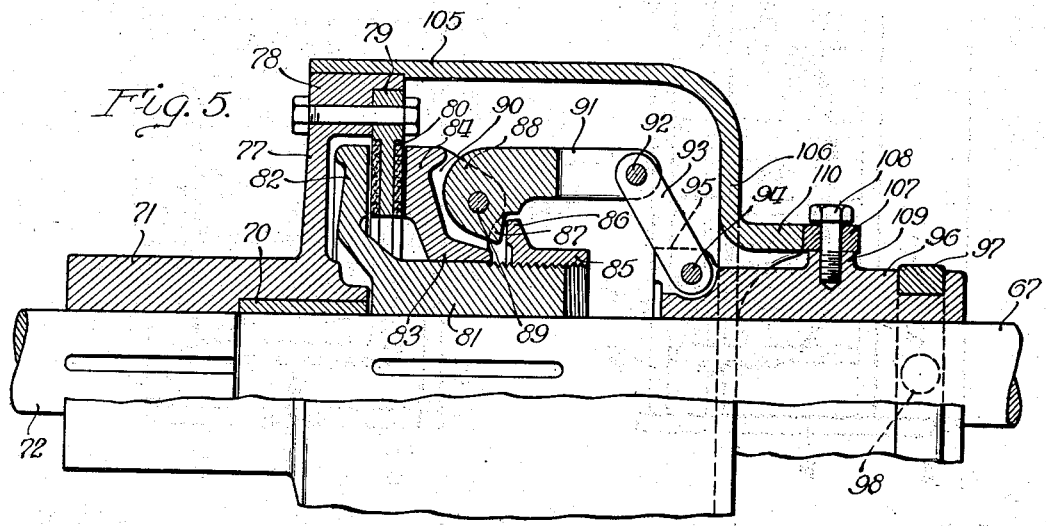
Figure 5 is a view partly in side view and partly in section of the clutch, on an enlarged scale, certain parts being shown in elevation.

It will be seen from Figure 5 that shank 91, of cam member 88, and link 93 provide a toggle structure, it being understood that, in practice, any suitable number, conveniently three, of cam members 88 and associated toggle structures are provided. When lever 101 is in its position shown in Figure 1, sleeve 96 is in its position shown in Figure 5, at which time the respective cam members 88 are disposed as shown in the latter figure, and the driven clutch plates 82 and 84 are out of clutching contact with the drive clutch plate 79. In order to clutch shaft 67 to shaft 72 for rotation therewith, lever 101 is swung toward the left, as viewed in Figure 1, a sufficient distance to move sleeve 96 from its position shown in Figure 5 inward into such position that the axis of pin 94 is disposed somewhat nearer the sleeve 81 than the axis of pin 92. That swings the respective cam members 88 in a counterclockwise direction, as viewed in Figure 5, about pin 89, which first brings nose 87 of the cam member into contact with flange 86 of sleeve 85. In the continued turning movement of the cam member, sleeve 85 and collar 83 are forced apart, thus moving the driven clutch plates 82 and 84 toward each other and forcing them into clamping contact with the drive clutch plate 79, in which position they are held, due to the disposition of pin 94 with its axis inward beyond the axis of pin 92. Shaft 67 is then clutched to shaft 72 to be driven thereby, thus revolving the table 9 at the desired speed. The clutch means is enclosed within a suitable housing 105 secured upon collar 78 of flange 77 in a suitable manner, as being shrunk upon this collar, bolted thereto, or in any other suitable way, this housing extending from collar 78 along shaft 67 and being provided, at its other end, with an inwardly extending flange 106 defining an opening which accommodates the sleeve 96.

It is desirable that means be provided for disengaging the clutch means in the event of overloading of table 9, to prevent injury or breakage of the motor 74, or of the table and associated drive means therefor. To that end I provide a roller 107, rotatably mounted on a cap screw 108, threaded in a boss 109 projecting from sleeve 96 radially thereof. Roller 107 is disposed to contact a substantially V-shaped cam element 110 extending outward from flange 106 parallel with sleeve 96, upon rotation of housing 105 relative to sleeve 96. Cam 110 is of such extent lengthwise of sleeve 96 and shaft 67 that, when the outer end of cam element 110 is in contact with roller 107, sleeve 96 is in its outer declutching position shown in Figure 5. With the shafts 67 and 72 clutched together, in the event of overloading of table 9 slippage between the clutch plates 79, and 82 and 84 will occur, with the result that clutch housing 105, and with it the cam element 110, will turn about shaft 67. When an inclined lateral face of cam element 110 contacts roller 107, the cam element acts to force the sleeve 96 outward into its position shown in Figure 5, thus declutching shaft 67 from shaft 72, after which sleeve 96 is held against inward movement into clutching position by the cam 110. When it is desired again to clutch shaft 67 to shaft 72, the latter shaft is turned slightly so as to move cam element 110 clear of roller 107, after which sleeve 96 may be moved inward into clutching position by means of the lever 101.

As has been previously stated, the bins containing the different materials, which are to be mixed together to form the mixture to be sintered, are usually disposed remote from the sintering machine and cannot be observed by the operator at that machine. It frequently is of importance that these materials be mixed in definite predetermined proportions, any substantial departure from which would adversely affect the sintering operation. It is desirable, therefore, that the operator at the sintering machine be apprised of any stoppage in operation of any of the feeder tables. For that purpose I provide suitable signal means operated responsive to the position of the clutch shift lever 101 to indicate whether or not the feeder table, driven through the clutch means controlled by that lever, is in operation. Conveniently, a signal board or panel 115 is suitably mounted in position to be readily observed by the operator at the sintering machine. This panel 115 carries signal means, such as a red lamp 116 and a green lamp 117, the former serving to indicate, when illuminated, that the corresponding feeder table 9 is not in operation, and the latter, when illuminated, serving to indicate that the corresponding feeder table is in operation. One pole of lamp 116 is connected by a lead 118 to a conductor 119 connected to a suitable source of electrical energy, and the other pole of lamp 116 is connected by a lead 120 to one contact member 121 of a switch 122, a second contact member 123 of which is connected by a lead 124 to a conductor 125 connected to the source of electrical energy. In like manner, one pole of lamp 117 is connected by a lead 126 to conductor 125, the other pole of lamp 117 being connected by a lead 127 to a contact member 128 of switch 122, a fourth contact member 129 of which is connected by a lead 130 to conductor 119. The contact members 121 and 123 comprise one pair, and the contact members 128 and 129 comprise a second pair, switch 122 comprising a contactor 131 shiftable to bridge one or the other pair of contact members. Referring to Figure 1, switch 122, which is of known type, is suitably mounted on a bracket 132 suitably secured to and extending upward from block 69. This switch includes a rockably mounted operating shaft 133, on which is secured a forked operating lever 134. A pin 135 is secured to lever 101 and extends therefrom between the arms of lever 134, the parts being so related that when clutch shift lever 101 is in its declutching position shown in Figure 1, contactor 131 bridges contact members 121 and 123, as indicated in dotted lines in Figure 6, thus opening the circuit of the green light 117 and closing the circuit of the red light 116. That serves to apprise the operator at the sintering machine that the corresponding feeder table 9 is out of operation. On the other hand, when the lever 101 is in clutching position, contactor 131 bridges the contact members 128 and 129, as shown in full lines in Figure 6, apprising the operator that the corresponding feeder table 9 is in operation.

Referring further to Figure 4, hub 36 extends upward a short distance beyond flange 35 and seats in a corresponding recess in the under face of flange 34. The vertical extent of hub 36 above flange 35 is considerably less than the vertical distance between the upper face of table 9 and the lower end of body 10 of hopper 8, and shaft 37 terminates within hub 36, preferably a short distance below the upper end thereof, as shown. That renders it possible, when flange 34 is unbolted from flange 35, to raise table 9 sufficiently to assure that flange 34 will clear flange 35 and hub 36. The covers 52 and 59 and their associated securing bolts are disposed within suitable recesses formed in the lower wall of housing 38, so as to clear the upper face of base 39, which upper face preferably is flat and continuous as shown.

The housing 38 and the parts mounted therein constitute a drive unit for rotating feeder table 9 as above described. In the event it is necessary to repair or replace such a unit, stub shaft 65 is uncoupled from shaft 67, at the coupling 66 therebetween, the bolts securing flanges 34 and 35 together are removed, table 9 is raised by appropriately located jacks into position to clear flange 35 and hub 36, and the drive unit is unbolted from and slid off of the base 39. A replacement drive unit may then be slid onto base 39 and bolted thereto, after which table 9 is lowered into position with flange 34 seating upon flange 35 of the replacement unit, flanges 34 and 35 are bolted together, stub shaft 65 of the replacement unit is coupled to shaft 67, and the table 9 is again set into operation. During the operations of removing and replacing the drive unit, the feeder table 9 is supported by the jacks in position to support the material upon the table and the material within the bin above it. The bin may contain from fifteen to twenty tons of material, which would be discharged therefrom if the table were removed. The time and work required for handling that amount of material would be considerable. By having the table remain in position that delay is avoided and, since the removal and replacement of the table drive unit may be effected comparatively quickly, any necessity for having feeder table 9 remain out of operation for a considerable length of time is avoided. That is of importance from the operating and production standpoint, since when a feeder table is out of operation the sintering machine which receives material from that table is also out of operation due to inability to obtain the proper mixture of materials to be sintered thereby.

I have shown the table 9 as being driven by an electric motor 74 individual thereto. While that practice may be followed if desired, it is also contemplated within my invention that a plurality of feeder tables may be driven by a suitable motor, each table having a drive shaft in which clutch means of the character herein disclosed is interposed, whereby driving, or attempted driving of a table when subjected to severe overloading will be avoided, and the condition of the table, with respect to its operation, will be indicated by appropriate signal means. It will be understood, of course, that the signal board or panel 115, with but two lamps thereon, is illustrative of a single feeder table, and that the number of pairs of lamps or signal devices on the board or panel will correspond to the number of feeder tables. As above indicated, and as will be understood, changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. In feeder means, a rotatably mounted feeder table, a hopper overlying said table with its lower end open and spaced above said table for delivering material thereto, a material retaining ring extending about said table circumferentially thereof and extending thereabove and secured thereto for vertical adjustment for varying the depth of a layer of material retained by said ring on said table, and a scraper plate mounted on said hopper for vertical adjustment with its lower edge substantially in the plane of the upper edge of said ring disposed to deflect material from said table outward over said ring.

2. In feeder means, a rotatably mounted feeder table, a hopper overlying said table with its lower end open and spaced above said table for delivering material thereto, a sealing ring mounted on said hopper for vertical adjustment and extending therebelow, a material retaining ring mounted on said table for vertical adjustment extending thereabove for retaining thereon a layer of material of a depth predetermined by the adjustment of said retaining ring, and a scraper plate mounted on said hopper for vertical adjustment with its lower edge substantially in the plane of the upper edge of said retaining ring disposed to deflect material from said table outward over said retaining ring.

3. In a feeder means, a hopper open at its upper and lower ends, a rotatably mounted feeder table underlying said hopper in spaced relation thereto, a base, a circumferential retaining ring mounted on said feeder table for vertical adjustment, a scraper plate mounted on said hopper for vertical adjustment with its lower edge substantially in the plane of the upper edge of said ring disposed to deflect material from said table over said ring, a drive unit removably secured on said base underlying said table and comprising a housing and a vertical shaft extending above said housing centrally of said table, and means at the upper end of said shaft detachably securing it to said table, said securing means comprising vertically interengaged members, the vertical clearance between said table and said hopper being sufficient to accommodate raising of said table into position to clear said shaft and said securing means.

4. In feeder means, a hopper open at its upper and lower ends, a rotatably mounted feeder table underlying said hopper in spaced relation thereto, a base, a circumferential retaining ring mounted on said feeder table for vertical adjustment, a scraper plate mounted on said hopper for vertical adjustment with its lower edge substantially in the plane of the upper edge of said ring disposed to deflect material from said table over said ring, a drive unit removably secured on said base underlying said table and comprising a housing and a vertical shaft extending above said housing centrally of said table, a flange secured on said shaft above said housing, a flange secured to said table concentric therewith depending therefrom and seating on said first flange, one of said flanges having a vertical extension and the other flange receiving said extension, and means detachably securing said flanges together, the vertical clearance between said table and said hopper being sufficient to accommodate raising of said table into position with said flanges disposed to clear each other and said extension and said shaft.

5. In feeder means, a hopper open at its upper and lower ends, a rotatably mounted feeder table underlying said hopper in spaced relation thereto, a base, a circumferential retaining ring mounted on and carried by said feeder table, a scraper plate mounted on said hopper with its lower edge substantially in the plane of the upper edge of said ring disposed to deflect material from said table over said ring, a drive unit removably secured on said base underlying said table and comprising a housing and a vertical shaft extending above said housing centrally of said table, and means detachably securing said shaft to said table, the vertical clearance between said table and said hopper being such that said table may be detached from said shaft and moved into position permitting removal and replacement of said drive unit and there supported by means independent of said drive unit and shaft whereby said table may remain substantially undisturbed and in approximately its normal operating position during removal and replacement of the driving unit.

EDWARD W. SHALLOCK.